Figure 1:
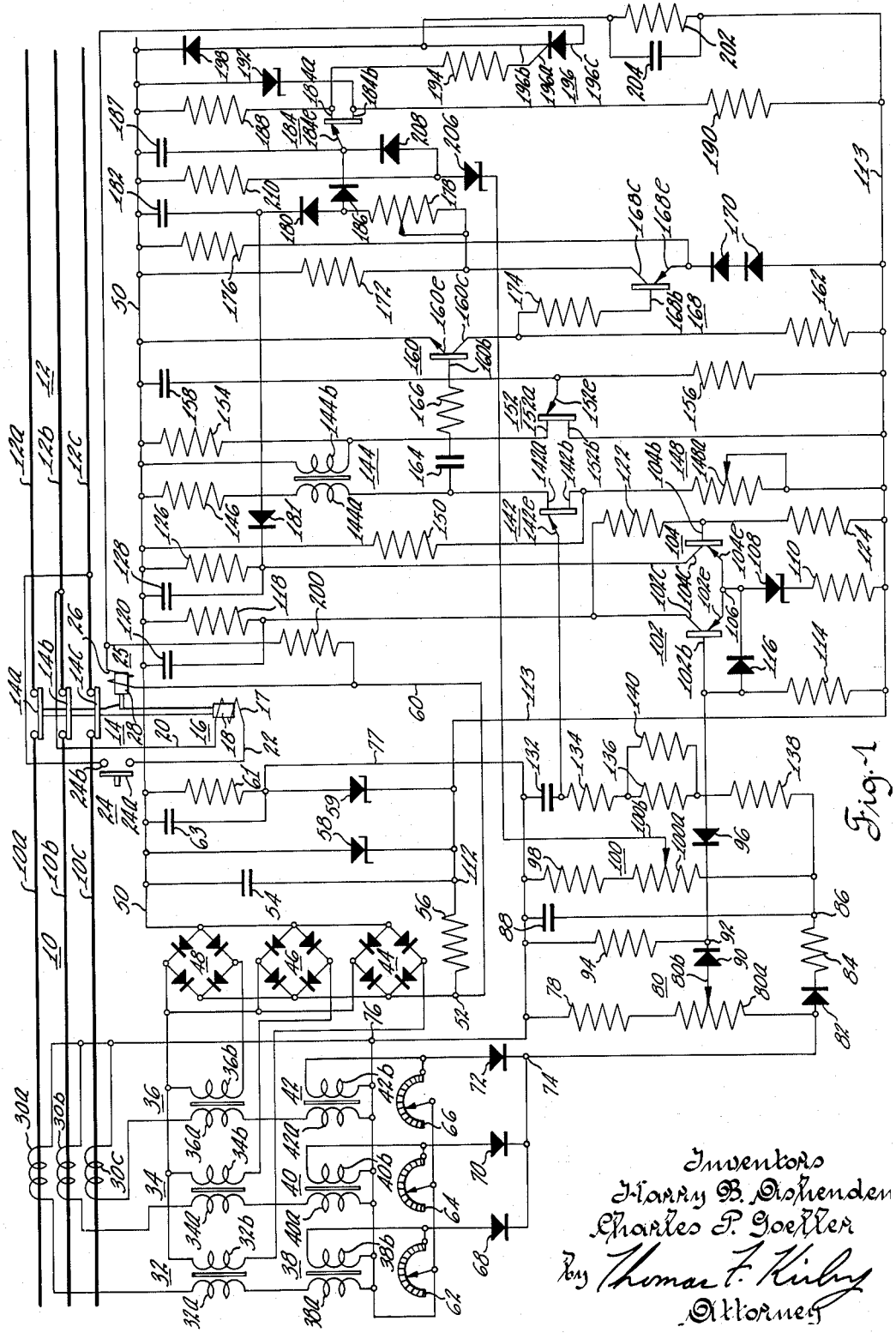

Inventors
Harry B. Ashenden
Charles P. Goeller
by Thomas F. Kirby
Attorney

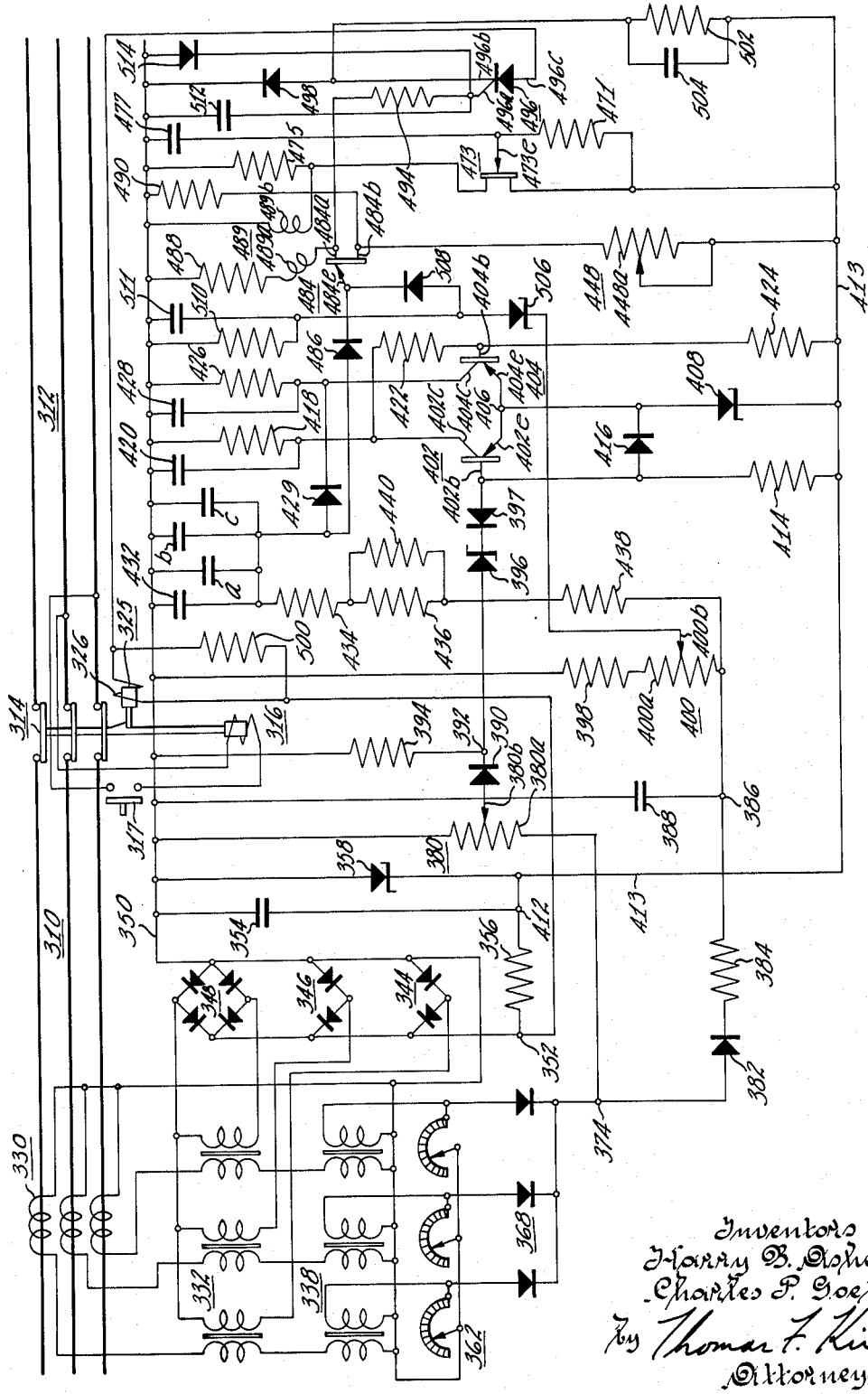

United States Patent Office 3,262,017
Patented July 19, 1966

3,262,017
STATIC OVERCURRENT TRIPPING DEVICE
Harry B. Ashenden, Cambridge, and Charles P. Goeller, Quincy, Mass., assignors to Allis-Chalmers Manufacturing Company, Milwaukee, Wis.
Filed Nov. 1, 1962, Ser. No. 234,820
7 Claims. (Cl. 317—33)

This invention relates generally to means for tripping circuit breakers when overcurrents exist for predetermined lengths of time in circuits being protected by the circuit breakers.

More particularly, the invention relates to such means employing static overcurrent tripping devices.

Heretofore, some circuit breakers were equipped with electromechanical series overcurrent tripping devices for detecting and timing overcurrents in circuits being protected. However, such electromechanical devices are not regarded as ideal with respect to their timing characteristics and accuracy and they are also subject to mechanical failure. It is desirable, therefore, to employ static overcurrent tripping devices instead, i.e. devices which employ nonmoving (static) electrical and electronic components. One known type of static overcurrent tripping device employs saturable core devices and depends on an external source of power, namely, batteries for its operation. It is desirable to provide a type of static overcurrent tripping device which eliminates these components and has other important advantages.

Accordingly, it is an object of this invention to provide an improved static overcurrent tripping device which is adapted for fabrication as a replaceable modular unit, which requires no secondary source of power, and which derives both an intelligence signal and power for operation from an overcurrent flowing through the circuit breaker with which it is associated.

Another object is to provide a device of the aforesaid character which has improved time-current operating characteristics and is adapted for greater accuracy in current and time regulation.

Another object is to provide a device of the aforesaid character which has a more ideal timing characteristic whereby, for example, the time for tripping varies inversely as the square of the overcurrent or varies by some other predetermined relationship.

Another object is to provide a device of the aforesaid character which is adjustable to provide a wide range of selection in the minimum current at which tripping will occur, i.e. from less than 100 amperes up to several thousand amperes, and which is further adjustable to provide for a short or long time delay before tripping at the current rating selected.

Another object is to provide a tripping device of the aforesaid character which has a definite and reasonably accurate, though very short, time delay at 30 to 40 times the minimum current at which tripping occurs.

Another object is to provide static overcurrent trip means having a trip curve which is substantially linear, when plotted on log-log coordinates, and the position and slope of which may be varied widely over the usable range and having an instantaneous trip range which will be increased from the five to fifteen times pickup current presently available to a tripping range of four to forty times pickup current.

Another object is to provide static overcurrent tripping means which has reduced area or bandwidth in its tripping characteristic and a more accurate resetting characteristic thereby allowing a greater number of circuit breakers and fuses to be applied selectively in series, and enabling more circuit breakers to be arranged to operate within a preselected time-current range.

Another object is to provide a device of the aforesaid character which is adapted for use with circuit breakers of different continuous current ratings by substitution of the current transformers employed therewith.

Another object is to provide a device of the aforesaid character which employs means, such as transistors, to make the device automatically resettable.

Another objetc is to provide a device of the aforesaid character which has a constant, very short reset time of predictable duration.

Another object is to provide a device of the aforesaid character which is compact, relatively economical to fabricate, employs standard components, and lents itself readily to repair or replacement.

Other objects and advantages of the invention will hereinafter appear.

In accordance with the present invention there is provided a circuit breaker for protecting an alternating current circuit, tripping means such as a tripping solenoid or a flux shifting magnetic latch release energizable to trip the circuit breaker in the event of an overcurrent, and means such as manually operable closing means or a closing solenoid energizable to reclose the circuit breaker after it has tripped. The tripping means are controlled by a static overcurrent tripping device (hereinafter called a static relay) incorporating the present invention. Current transformers located on the circuit breaker studs respond to an overcurrent to provide a signal which serves as the intelligence for the static relay and a supply of power for operating the static relay and the tripping means. The current transformers provide a small low voltage A.C. secondary current which is proportional to the A.C. primary current in the circuit breaker studs. The secondary winding of each current transformer is connected in series with a power supply transformer and an auxiliary transformer. Alternating current from the power supply transformers is rectified and filtered to provide D.C. energy for operating the tripping means and for powering the circuits in the static relay. Potentiometers or rheostats are connected in parallel with the auxiliary transformers to provide, in the event of an overcurrent in the circuit breaker, a regulatable A.C. signal voltage which is proportional to the current in the primary of the current transformers and serves as the intelligence input for the static relay. More particularly, the magnitude of this A.C. signal voltage determines whether or not the circuit breaker will trip and determines the amount of time delay before tripping. The potentiometers are a pickup adjustment and can be regulated to vary the minimum primary current at which tripping of the circuit breaker will occur. The A.C. signal voltage from the potentiometers is rectified and filtered.

In accordance with one embodiment of this invention, the D.C. signal is fed to a trigger circuit and to a time shaping circuit. From the time shaping circuit the signal is fed to an oscillator or pulsing circuit and from thence to a timing circuit. If the D.C. signal voltage is greater than a predetermined value, the trigger circuit will operate. More specifically, the trigger circuit prevents operation of the timing circuit unless the D.C. signal voltage which is proportional to primary current exceeds, for example, 95 percent of pickup value. The time shaping circuit determines the shape and slope of the time-current characteristic curve. The oscillator circuit gives the D.C. signal the form, for example, of a pulsing D.C. square wave having a pulsation rate which varies with the strength of the signal voltage, i.e. the pulse repetition rate is proportional to the primary current in the circuit breaker. In a preferred embodiment, the pulse repetition rate is substantially proportional to the square of the primary current. The pulsating D.C. signal from the oscillator circuit is fed to the timing circuit and, if the trigger circuit has operated, a capacitor in the timing circuit will gradually be charged by the pulses to a voltage which causes a static switching circuit to operate. Operation of the switching circuit effects energization of the tripping means to trip the circuit breaker. If at any time before the switching circuit actually operates, the primary current decreases to 95 percent or less of the preselected pickup value, the trigger circuit will turn off and resetting will take place. The time delay for tripping at any specific value of primary current can be varied widely by changing the resistance in the timing circuit, and provisions are made for instantaneous tripping. After the circuit breaker trips, it can be reclosed manually or by energization of the closing solenoid in a well known manner.

In accordance with another embodiment of the invention, the rectified and filtered D.C. signal is fed to a trigger circuit, similar to that hereinbefore described, and directly to a timing circuit. This other embodiment differs from the one embodiment hereinbefore described principally in that the D.C. signal is not formed into a pulse by an oscillator or pulsing circuit but is employed in a steady form to charge capacitor means gradually. This change results in a simple circuit and substantially reduces costs of manufacture and assembly of the static relay. When the capacitor means is charged to a predetermined voltage, it causes a static switching circuit, similar to that hereinbefore described, to operate to effect energization of the tripping means to trip the circuit breaker.

The accompanying drawings comprise FIGURE 1 and FIGURE 2 which illustrate two preferred embodiments of the invention which will hereinafter be more particularly described, it being understood that the embodiments illustrated are susceptible to modifications with respect to details thereof without departing from the scope of the appended claims.

Referring to FIG. 1, the numeral 10 designates a protected circuit such as a three phase alternating current circuit having phase conductors 10a, 10b and 10c. Protected circuit 10 is connected to an associated circuit 12 which is understood to supply power through circuit interrupting means such as a circuit breaker 14 having movable contacts 14a, 14b and 14c. In the event of an overcurrent fault on protected circuit 10, the latter may be isolated from associated circuit 12 by the opening of circuit breaker 14.

Circuit breaker 14 is understood to be a latched closed circuit breaker and is provided with closing or reclosing means such as a solenoid 16 having a coil 17 and an armature 18 which is understood to move upward with respect to FIG. 1 to effect closure of the contacts when coil 17 is energized. Coil 17 is connected on one side by a conductor 20 to a phase conductor 12b and on its other side by a conductor 22 through a normally open reset switch 24 to a phase conductor 12c. Reset switch 24 comprises a movable contact 24a and a pair of stationary contacts 24b. If circuit breaker 14 is tripped open, momentary closure of reset switch 24 effects energization of coil 17 of solenoid 16, upward movement of armature 18, and reclosure of contacts 14a, 14b and 14c of the circuit breaker.

Circuit breaker 14 is also provided with tripping means. FIG. 1 shows the tripping means to comprise a normally deenergized tripping solenoid 25 having a coil 26 and an armature 28 which is understood to move to the right with respect to FIG. 1 to effect tripping of circuit breaker 14 when coil 26 is energized. Coil 26 is connected to the static overcurrent tripping device as hereinafter explained and is adapted to be controlled thereby to trip circuit breaker 14. If preferred, a flux shifting magnetic latch release which uses less power may be used instead of tripping solenoid 25. In a flux shifting magnetic latch release a spring loaded armature is normally held in position by flux from a permanent magnet. Energization of its coil causes a shift in the flux to release the armature and tripping of the circuit breaker.

In accordance with one embodiment of the present invention, three current transformers having secondary windings 30a, 30b and 30c are associated with the phase conductors 10a, 10b and 10c, respectively, of protected circuit 10. In actual practice, the current transformers may be of the bushing or toroidal type and would be associated with the studs of circuit breaker 14. The current transformers provide a small low voltage secondary current which is proportional to the alternating current in the phase conductors. This secondary current ultimately provides the energy for the circuity in the static relay and for tripping solenoid 25 and also provides the intelligence for the static relay hereinafter described in connection with FIG. 1.

The secondary windings 30a, 30b and 30c of the current transformers are connected in series with the primary windings 32a, 34a and 36a, respectively, of power supply transformer 32, 34 and 36, respectively, and the primary windings of the latter are connected in series with the primary windings 38a, 40a and 42a, respectively, of auxiliary transformers 38, 40 and 42, respectively.

The secondary windings 32b, 34b and 36b of the power supply transformer 32, 34 and 36, respectively, are connected to the input terminals of bridge rectifiers 44, 46 and 48, respectively, to provide a supply of rectified low voltage power on the conductor 50 and at point 52 for operation of coil 26 of tripping solenoid 25 and for operation of the various circuits and components of the static relay. This supply of rectified low voltage power is filtered by a filter capacitor 54 which is connected in series with a resistor 56 between conductor 50 and point 52. A Zener diode 58 is connected across filter capacitor 54 to regulate the voltage of the power supply for the circuits. A network comprising a Zener diode 59 and a resistor 61 in series therewith is connected in parallel with Zener diode 58. A capacitor 63 is connected across resistor 61. One side of tripping coil 26 is connected by a conductor 60 to point 52 and the other side of the tripping coil is connected as hereinafter explained.

Potentiometers or rheostats 62, 64 and 66 are connected in parallel with the secondary windings 38b, 40b and 42b, respectively, of the auxiliary transformers 38, 40 and 42, respectively.

The auxiliary transformers provide very small A.C. signal currents which are proportional to the primary currents in the current transformer and as these small signal currents flow through the potentiometers they produce a small A.C. signal voltage which is also proportional to the primary current. The potentiometers afford a means for regulating these small A.C. signal voltages, and serve as a pickup adjustment for selecting the minimum primary current at which the static relay will operate to eventually trip the circuit breaker. The potentiometers 62, 64 and 66 are connected through rectifiers 68, 70 and 72, respectively, to a point 74. The small A.C. signal voltages at the potentiometers drive small currents through the rectifiers to point 74. Thus, a signal appears across point 74 and a point 76 to serve as the intelligence input signal for the static overcurrent trip device of FIG. 1. Point 76 is connected by a conductor 77 to a point between Zener diode 59 and resistor 61.

A voltage dividing network comprising a resistor 78 and the resistance element 80a of a rheostat 80 in series with each other are connected across the points 76 and 74. Rheostat 80 serves as a means of adjusting the signal voltage at which the trigger circuit operates and is adjustable at the factory to allow for tolerances in commercial components. Movable contact 80b of rheostat 80 is adjustable to operate a trigger circuit, hereinafter described, and to thereby start a timing function at some desired level of primary current. The trigger circuit is a form of the well known Schmitt trigger circuit.

A cicuit is provided for rectifying and filtering the A.C. signal voltage and comprises a diode 82 and a resistor 84 which are connected in series with each other between point 74 and a point 86. A capacitor 88 is connected across point 76 and point 86 and the voltage across the capacitor is proportional to the primary current in the current transformers 30a, 30b and 30c. Resistor 84 and capacitor 88 comprise a peak filter since, it is to be understood, the signal voltage at point 86 is very close to the peak value of the A.C. signal voltage. The static relay responds to the highest value of current in any one of the three phases and it makes no difference whether the overcurrent is in any one phase or all three. The rectifying and filtering circuit further comprises a diode 90 which is connected between movable contact 80b of rheostat 80 and a point 92. A resistor 94 is connected between the points 76 and 92. A diode 96 is connected between point 92 and the base of a transistor hereinafter described.

Diode 82 is a blocking diode to prevent discharge of capacitor 88 through resistance element 80a of rheostat 80 and through resistor 78 during alternate half cycles. It is to be noted that the rectifiers 68, 70 and 72 are half wave rectifiers and that consequently pulsating direct current appears at diode 82.

Diode 90 is provided to cause the base current of a transistor 102, hereinafter described, to flow through resistor 94 only, rather than partly through resistance element 80a of rheostat 80 and resistor 78.

A voltage dividing network comprising a resistor 98 and the resistance element 100a of a potentiometer 100 are connected in series with each other across the points 76 and 86. The movable contact 100b of potentiometer 100 is connected as hereinafter explained. It is to be understood that potentiometer 100 which is connected across the signal circuit is part of an instantaneous tripping circuit and is adjustable to set the current point at which coil 26 of tripping solenoid 25 becomes energized to trip circuit breaker 14 instantaneously.

The trigger circuit, hereinbefore referred to, is provided to prevent a timing circuit, hereinafter described, from operating and thus to prevent breaker 14 from tripping in the event that primary current and consequently, the signal voltage, are below some predetermined value which is the minimum at which it is desired to have the circuit breaker trip. The trigger circuit comprises two transistors 102 and 104 which are understood, for example, to be of the PNP type.

The base 102b of transistor 102 is connected to diode 96. The emitters 102e and 104e of the transistors 102 and 104, respectively, are connected to a common point 106 as is characteristic of the Schmitt trigger circuit. A Zener diode 108 and a temperature compensating resistor 110 are connected in series with each other between point 106 and a conductor 113. Note that point 112 is connected to and energizes a conductor 113. Temperature compensating resistor 110 prevents variation in the pickup point. A temperature compensating resistor 114 is connected between base 102b and conductor 113. A diode 116 is connected between base 102b of transistor 102 and point 106. A resistor 118 is connected between the collector 102c of transistor 102 and conductor 50. A capacitor 120 is connected across resistor 118.

A voltage divider network is provided and comprises a resistor 122 and a resistor 124 which are connected in series with each other between conductor 113 and collector 102c of transistor 102. The base 104b of transistor 104 is connected to a point between the resistors 122 and 124. A resistor 126 is connected between the collector 104c and conductor 50. A capacitor 128 is connected across resistor 126.

If the primary current and, thus, the signal voltage to base 102b of transistor 102 are below a predetermined value, transistor 102 is biased to "on" and the timing circuit will not function. Consequently, coil 26 of tripping solenoid 25 will not be energized. However, in the event that the signal voltage exceeds a predetermined value, transistor 102 becomes biased to "off" and transistor 104 becomes biased to "on." When transistor 104 is biased to "on," a voltage appears across capacitor 128 and resistor 126 which blocks the flow of current from a capacitor 182, hereinafter described, and the latter can then be charged to cause tripping solenoid 25 to eventually trip circuit breaker 14, as hereinafter explained.

If at any time while the static relay is timing out, the primary current and, consequently, the signal voltage to base 102b of transistor 102 decreases below the minimum value for which the static relay is set to cause tripping, the diode 96 will cease to block the base current to transistor 102 and the latter will bias to "on." In this event, transistor 104 will bias to "off" and any charge on capacitor 182 will flow off through a diode 181 and resistor 126. The static relay is thus reset and does not function again until the primary current again increases above the minimum pickup point.

A nonlinear resistance network is connected in series with a capacitor 132 between the points 74 and 76 and comprises resistors 134, 136 and 138 which are connected in series with each other. A resistor 140 is connected in parallel with resistor 136. Capacitor 132 is part of a pulse generating circuit and is charged by steady D.C. current.

The pulse generating circuit is provided to afford a source of pulses having a repetition rate which is related to the signal voltage. The relationship between the pulse repetition rate and the signal voltage can be varied between wide limits by changes in the resistance values in the nonlinear resistance network. For example, the pulse repetition rate may be varied approximately as the square of the primary current. However, other relationships could be provided for. The pulse generating circuit comprises a unijunction transistor 142 having an emitter 142e which is connected to a point between capacitor 132 and resistor 134 of the nonlinear resistance network. A transformer 144 has one end of its primary winding 144a connected to conductor 50 through a resistor 146. A voltage dividing network comprising a potentiometer 148 and a resistor 150 in series therewith is connected between the conductors 113 and 50. Base two 142b of unijunction transistor 142 is connected to a point between potentiometer 148 and resistor 150. Potentiometer 148 is adjustable to vary the base to base voltage of transistor 142 and consequently the peak point emitter voltage at which transistor 142 fires to discharge capacitor 132 and thereby create a pulse. This is a factory adjustment provided to allow for tolerances in commercial components.

The pulse generating circuit operates as follows. When a signal voltage appears across the points 76 and 86, current flows through the nonlinear resistance network and capacitor 132 gradually charges to a voltage which exceeds the peak point voltage of unijunction transistor 142. Unijunction transistor 142 then fires and discharges capacitor 132 through primary winding 144a of transformer 144 and resistor 146 thereby creating a small pulse. Capacitor 132 then immediately charges and discharges again and continues to repeat this process until coil 26 of tripping solenoid 25 is energized and circuit breaker 14 trips, or until the primary current decreases to a sufficiently low value so that tripping is not required.

It is desirable that unijunction transistor 142 be able to fire at a very low current, i.e., at a much lower current than it would otherwise be when energized from capacitor 132 when the latter is being charged by a very small charging current. This feature is desirable in order to cover the wide range of time delays provided for by the static relay shown in FIG. 1, particularly, when starting with a very small charging current on capacitor 132 at the minimum pickup value of the signal. Accordingly, there is provided a unijunction transistor 152 which has its base one 152a connected through the secondary winding 144b of transformer 144 to conductor 50. A resistor 154 is connected across secondary winding 144b of transformer 144. A resistor 156 is connected in series with a capacitor 158 between the conductors 113 and 50 and the emitter 152e of unijunction transistor 152 is connected to a point between resistor 156 and capacitor 158. Unijunction transistor 152 generates small pulses at a constant rate of repetition which are fed through transformer 144 and periodically reduce the base to base voltage of unijunction transistor 142.

A voltage amplifier circuit is provided to amplify the pulses from unijunction transistor 142. This circuit comprises a transistor 160 of the NPN type, for example. The emitter 160e of transistor 160 is connected to conductor 50 and the collector 160c is connected through a resistor 162 to conductor 113. A capacitor 164 is connected in series with a resistor 166 between the base 160b of transistor 160 and a point between primary winding 144a of transformer 144 and base one 142a of unijunction transistor 142. The voltage amplifier circuit further comprises a transistor 168 of the PNP type, for example. The emitter 168e is connected through a pair of series connected rectifiers 170 to conductor 113. The collector 168c of transistor 168 is connected through a resistor 172 to conductor 50. The base 168b of transistor 168 is connected through a resistor 174 to a point between resistor 162 and the collector 160c of transistor 160. A resistor 176 is connected between conductor 50 and a point between rectifiers 170 and emitter 168e of transistor 168.

When a pulse of current occurs in primary winding 144a of transformer 144 and resistor 146, a corresponding pulse of current is driven through capacitor 164 and resistor 166 to base 160b of transistor 160 to turn the latter "on" momentarily. This in turn causes a pulse of current to be driven through resistor 174 to base 168b of transistor 168 to turn the latter "on" momentarily and effectively amplifies the relatively low voltage pulse which appears at transformer 144.

A potentiometer 178, a diode 180, and a capacitor 182 are connected in series with each other between conductor 50 and a point between resistor 172 and collector 168c of transistor 168. A diode 181 is connected between a point between diode 180 and capacitor 182 and a point between resistor 126 and collector 104c of transistor 104. A portion of the pulses generated by transistor 168 go through potentiometer 178 and rectifier 180 to charge capacitor 182 gradually. The time required to charge capacitor 182 depends on the pulse repetition rate and the setting of potentiometer 178. If potentiometer 178 is set to provide high resistance, less energy per pulse will go into capacitor 182.

The switching circuit comprises a unijunction transistor 184 which has its emitter 184e connected through a diode 186 to a point between potentiometer 178 and diode 180. Emitter 184e of unijunction transistor 184 is also connected through a capacitor 187 to conductor 50. Base one 184a of unijunction transistor 184 is connected through a resistor 188 to conductor 50 and base two 184b is connected through a resistor 190 to conductor 113. Base two 184b of unijunction transistor 184 is also connected through a Zener diode 192 to conductor 50. Base one 184a of unijunction transistor 184 is also connected through a resistor 194 to the gate 196a of a silicon controlled rectifier 196. The cathode 196b of silicon controlled rectifier 196 is connected through a diode 198 to conductor 50. The anode 196c of silicon controlled rectifier 196 is connected to the other side of coil 26 of tripping solenoid 25. A resistor 200 is connected in parallel across coil 26 of tripping solenoid 25. A resistor 202 is connected between cathode 196b of silicon controlled rectifier 196 and conductor 113. A capacitor 204 is connected in parallel across resistor 202.

When capacitor 182 is eventually charged by pulses to a voltage which closely approaches the peak point voltage of unijunction transistor 184, the next pulse will then fire the unijunction transistor to cause a pulse of voltage to appear across resistor 188. This pulse of voltage drives gate 196a of silicon controlled rectifier 196 and causes the latter to turn "on." With silicon controlled rectifier 196 "on," coil 26 of tripping solenoid 25 is energized thereby causing its solenoid 28 to move and circuit breaker 14 to trip open. When circuit breaker 14 opens, the current transformers 30a, 30b and 30c which are associated with protected circuit 10 are deenergized and the static relay resets itself.

Note that capacitor 182 is blocked by diode 180. The portion of the pulse generated by transistor 168 which appears across resistor 188 when unijunction transistor 184 fires is usually sufficient to cause controlled rectifier 196 to fire. However, the current required to fire a component such as rectifier 196 may vary due to manufacturing tolerances of the latter. Therefore, capacitor 187, which is understood to be relatively small compared to capacitor 182, is provided as a safety factor in the event that the pulse across resistor 188 is not sufficient. When transistor 184 fires, capacitor 187 discharges through it to create a pulse which is always sufficient to drive the gate of controlled rectifier 196.

Referring again to potentiometer 100 which is part of the instantaneous trip circuit, it is seen that its movable contact 100b is connected through a Zener diode 206 and a diode 208 to emitter 184e of unijunction transistor 184. A resistor 210 is connected between conductor 50 and a point between Zener diode 206 and diode 208. If potentiometer 100 is set for instantaneous trip, a predetermined signal voltage therefrom causes unijunction transistor 184 to fire instantaneously to effect operation of solenoid 28 and tripping of circuit breaker 14, as hereinbefore described.

The apparatus shown in FIG. 1 operates as follows: assume that circuit breaker 14 is closed and that tripping solenoid 25 is deenergized. Further, assume that the static relay is adjusted so that instantaneous trip will not occur. Assume that an overcurrent appears in circuit 10 and that the current transformers, the power transformers and the auxiliary transformers are responding thereto. It will be understood that the static relay is thus being provided with power for its operation and with intelligence information and that tripping solenoid 25 is in readiness to be energized from this same supply of power. Further, assume that potentiometer 80 has been adjusted to operate the trigger circuit and start the timing at some predetermined value of primary current. As long as the overcurrent is below the predetermined value, transistor 102 is biased to "on" and transistor 104 is biased to "off." As soon as the signal exceeds the predetermined value, transistor 102 turns "off" and transistor 104 turns "on." With transistor 104 "on," a voltage appears across capacitor 128 and resistor 126 which blocks the flow of current from capacitor 182. Capacitor 182 is now in readiness to be charged by the pulse generator. Current flow through the nonlinear resistance network referred to hereinbefore, causes capacitor 132 to charge. When capacitor 132 is gradually charged to a voltage which exceeds the peak voltage of unijunction transistor 142, the latter fires and discharges capacitor 132 through transformer 144 and resistor 146 creating a small pulse. Capacitor 132 continues to charge and discharge until the circuit breaker trips or the primary current decreases to a value which is sufficiently low that tripping is not required. The pulse across transformer 144 and resistor 146 drives a pulse of current through capacitor 164 to the base of transistor 160 to turn the latter "on" momentarily and provides a pulse at much higher voltage which causes capacitor 182 to charge. Repetition of this pulsation gradually charges capacitor 182 to a voltage which exceeds the peak point of voltage of unijunction transistor 184. The next pulse will then fire unijunction transistor 184 to create a pulse of voltage which turns "on" controlled rectifier 196. When the latter is turned "on," tripping solenoid 25 becomes energized and circuit breaker 14 trips. When circuit breaker 14 trips the current transformers 30 are deenergized. Consequently, blocking voltage across resistor 126 and capacitor 128 disappears and capacitor 182 discharges immediately through diode 181 and resistor 126. The static relay is then reset and ready to again provide full time delay should a fault still exist when the circuit breaker is reclosed.

Referring now to FIG. 2, it is seen that the other embodiment of the invention is employed with a protected circuit 310, an associated circuit 312 and a circuit breaker 314 which are similar to the corresponding elements in FIG. 1. Circuit breaker 314 is provided with a closing solenoid 316 having a switch 317 and with a tripping solenoid 325 similar to the solenoids 16 and 25 hereinbefore described in connection with FIG. 1. Tripping solenoid 325 comprises a coil 326 which is connected as hereinafter explained. If preferred, a flux shifting magnetic latch release could be used instead of tripping solenoid 325.

The embodiment shown in FIG. 2 employs current transformers 330, power supply transformers 332, auxiliary transformers 338, potentiometers or rheostats 362 and rectifiers 368 which are understood, for example, to be similar in form, function and manner of association to the corresponding elements in FIG. 1, hereinbefore described. The embodiment shown in FIG. 2 further comprises bridge rectifiers 344, 346 and 348 which provide a supply of rectified low voltage power across a conductor 350 and a point 352. This supply of rectified low voltage power is filtered by filter capacitor 354 which is connected in series with resistor 356 between conductor 350 and point 352. A Zener diode 358 is connected across filter capacitor 354 to regulate the voltage of the power supply for the circuits.

The potentiometers 362 are connected through the rectifiers 368 to a point 374. A signal appearing between point 374 and conductor 350 serves as the intelligence input signal for the static relay shown in FIG. 2.

A circuit is provided for rectifying and filtering the A.C. signal voltage and comprises a diode 382 and a resistor 384 which are connected in series with each other between point 374 and a point 386. A capacitor 388 is connected between conductor 350 and point 386 and the voltage across the capacitor is proportional to the primary current. Resistor 384 and capacitor 388 comprise a peak filter.

The resistance element 380a of a rheostat or potentiometer 380 is connected between conductor 350 and point 374. Rheostat 380 controls the tripping of the circuit i.e., it determines at what predetermined signal voltage tripping will occur. The setting of rheostat 380 is a factory adjustment. A diode 390 is connected between movable contact 380b of rheostat 380 and a point 392. A resistor 394 is connected between conductor 350 and point 392. A Zener diode 396 and a diode 397 are connected in series with each other between point 392 and the base of a transistor hereinafter described.

A voltage dividing network comprising a resistor 398 and a resistance element 400a of a potentiometer 400 are connected in series with each other between conductor 350 and point 386. Potentiometer 400 is part of an instantaneous tripping circuit similar to the instantaneous tripping circuit shown in FIG. 1. A Zener diode 506 is connected in series with a resistor 510 between movable contact 400b of potentiometer 400 and conductor 350. A capacitor 511 is connected across resistor 510. When signal voltage is high enough, Zener diode 506 breaks down to pass current and create a voltage drop across resistor 510 and capacitor 511 which exceeds the peak point emitter voltage of a unijunction transistor 484, hereinafter described. The latter then fires to discharge capacitor 511 through resistor 488 to create a pulse which fires a controlled rectifier 496, hereinafter described, thereby causing energization of tripping solenoid 325 and tripping of circuit breaker 314. The signal voltage and thus the primary current at which this occurs can be adjusted by regulation of potentiometer 400.

One side of coil 326 of tripping solenoid 325 is connected to point 352.

A nonlinear resistance network is connected in series with a capacitor 432 and a resistor 438 between conductor 350 and point 386. The nonlinear resistance network comprises a resistor 434 which is in series with a resistor 436 and a resistor 440 is connected in parallel with resistor 436. Capacitors 432a, 432b and 432c are connected in parallel with each other across capacitor 432. This bank of four capacitors connected in parallel is adapted to be charged by a steady D.C. current and is adapted to discharge to effect tripping as hereinafter explained. The nonlinear resistance network is a time shaping circuit since it determines the shape and slope of the current-time characteristic for the device. In a preferred embodiment, it is desired to provide for a time delay which varies inversely with the square of the primary current, thus, charging current would flow into the capacitor bank 432 at a much faster rate of increase than the rate of increase in the D.C. signal voltage. Changes in the number or the capacitance of the capacitors in bank 432 changes the amount of time delay without changing the slope or shape of the characteristic timing curve.

A trigger circuit is provided to prevent the timing circuit from operating and thereby preventing circuit breaker 314 from tripping if the primary current and consequently, the signal voltage, are below some preset value which is the minimum at which the user wishes to have the circuit breaker trip. The trigger circuit comprises two transistors 402 and 404 which are understood, for example, to be of the PNP type.

The base 402b of transistor 402 is connected to diode 397. The emitters 402e and 404e of the transistors 402 and 404, respectively, are connected to a common point 406. A Zener diode 408 is connected between point 406 and a conductor 413 which is understood to be connected to point 412. A resistor 414 is connected between conductor 413 and the base 402b of transistor 402. A diode 416 is connected between the base 402b of transistor 402 and common point 406. A resistor 418 is connected between conductor 350 and the collector 402c of transistor 402. A capacitor 420 is connected across resistor 418. A resistor 426 is connected between conductor 350 and the collector 404c of transistor 404. A capacitor 428 is connected across resistor 426. Diode 429 is connected between a point between resistor 434 and the bank of capacitors hereinbefore referred to and the collector 404c of transistor 404. A resistor 422 is connected in series with a resistor 424 between collector 402c of transistor 402 and conductor 413. The base 404b of transistor 404 is connected to a point between resistor 422 and 424.

The bank of capacitors 432, 432a, 432b and 432c is adapted to discharge into a switching circuit. The switching circuit comprising a unijunction transistor 484 which has its emitter 484e connected through a diode 486 to a point between the bank of capacitors and resistor 434. When the bank of capacitors 432 is charged to a predetermined value, unijunction transistor 484 fires to discharge the capacitors through resistor 488 to create a pulse at a silicon controlled rectifier 496 which turns the latter "on" and causes tripping of the circuit breaker 314. A diode 508 is connected between emitter 484e of unijunction transistor 484 and a point between Zener diode 506 and resistor 510. A resistor 488 is connected in series with the primary winding 489a of a pulsing transformer 489 between conductor 350 and the base one 484a of unijunction transistor 484. The resistance element 448a of a potentiometer 448 is connected between conductor 413 and the base two 484b of unijunction transistor 484. Base two 484b of unijunction transistor 484 is also connected through a resistor 490 to conductor 350. Potentiometer 448 and resistor 490 provide an adjustment of base to base voltage for unijunction transistor 484 and regulate the peak point emitter voltage required for firing unijunction transistor 484. Regulation of this voltage changes the time required for capacitor bank 432 to charge sufficiently to fire unijunction transistor 484. This is a factory adjustment.

A resistor 471, a unijunction transistor 473, a resistor 475, a capacitor 477 and pulse transformer 489 comprise a pulse generator which generates a multiplicity of pulses per second to momentarily lower the base voltage of unijunction transistor 484 by a fraction of a volt. This permits unijunction transistor 484 to fire when the voltage across capacitor bank 432 exceeds the peak point emitter voltage of unijunction transistor 484 by drawing energy from capacitor bank 432. At low values of overcurrent, the current flowing through resistance network comprising the resistance 438, 436, 440 and 434 is not sufficient to turn on unijunction transistor 484 and it is necessary to draw current from the charged capacitor to do so. It would be possible to change the values of resistors 438, 436, 440 and 434 to pass more current at low signal voltages but this would require larger capacitors to obtain the long time delay required. The bases one and two of unijunction transistor 473 are connected in series with resistor 475 between the conductors 350 and 413. Resistor 471 is connected between the emitter 473e of unijunction transistor 473 and a base thereof. The secondary winding 489b of transformer 489 is connected on one side to conductor 350 and on its other side to a point between resistor 475 and another base of unijunction transistor 473. Capacitor 477 is connected between conductor 350 and the emitter 473e of unijunction transistor 473.

The base one 484a of unijunction transistor 848 is connected through a resistor 494 to the gate 496a of controlled rectifier 496 hereinafter described. The cathode 496b of controlled rectifier 496 is connected through a diode 498 to conductor 350. The anode 496c of controlled rectifier 496 is connected to the other side of coil 326 of tripping solenoid 325. A resistor 500 is connected in parallel across coil 326 of tripping solenoid 325. A resistor 502 is connected between cathode 496b of controlled rectifier 496 and conductor 413. A capacitor 504 is connected in parallel across resistor 502. A capacitor 512 is connected between conductor 350 and gate 496a of controlled rectifier 496. A diode 514 is connected between conductor 350 and gate 496a of controlled rectifier 496.

A circuit comprising the static relay shown in FIG. 2 operates as follows.

Assume that circuit breaker 314 is closed and that tripping solenoid 325 is deenergized. Further, assume that potentiometer 400 of the static relay is adjusted so that instantaneous trip will not occur. Assume also that the potentiometers 362 are adjusted to determine the minimum value of primary current at which the static relay will cause tripping of the circuit breaker. Assume that an overcurrent appears in circuit 310 and that the current transformers, the power transformers and the auxiliary transformers are responding thereto. It will be understood that the static relay is thus being provided with power for its operation and with intelligence information and that tripping solenoid 325 is in readiness to be energized from this same supply of power. Further, assume that potentiometer 380 has been adjusted to set the trigger circuit and to set the timing at the predetermined value of primary current.

As long as the overcurrent, and thus the signal voltage, is below the predetermined value of primary current, transistor 402 is biased to "on" and is conductive. The resulting voltage across resistor 418 biases transistor 404 to "off." Consequently, no current flows through resistor 426 to create a voltage drop and capacitor bank 432 can discharge through resistor 426. Accordingly, capacitor bank 432 cannot charge even though D.C. signal current may be flowing through the resistor network comprising resistors 438, 436, 440 and 434.

As soon as the voltage at potentiometer 380 is high enough, transistor 402 biases to "off" and transistor 404 biases to "on" and the resulting current flow therethrough causes a voltage across resistor 426 and capacitor 428 which blocks discharge from capacitor bank 432 and the latter then charges. Time required to charge the capacitor bank 432 provides the time delay before tripping.

If at any time before tripping occurs, the primary current decreases a small percentage below pickup value, transistor 402 turns "on" and transistor 404 turns "off." Thus, blocking voltage is removed from resistor 426 and capacitor bank 432 immediately discharges, i.e., resetting of the static relay takes place.

Capacitor bank 432 is charged from a nonpulsing D.C. signal through the nonlinear resistance network. When capacitor bank 432 is charged to a predetermined value, unijunction transistor 484 fires to discharge the capacitors in bank 432 through resistor 488. A pulse appears at controlled rectifier 496 and the latter turns "on" to effect energization of coil 326 of tripping solenoid 325. Energization of the latter effects tripping of circuit breaker 314. When the circuit breaker opens, there is no current flow through the current transformer 315 and the static relay and tripping solenoid 325 are deenergized and reset themselves. Capacitor bank 432 discharges any remaining power through resistor 426 since there is no blocking voltage and is ready to provide for full time delay as soon as circuit breaker 314 is reclosed, if an overcurrent still exists.

Having now particularly described and ascertained the nature of our said invention and the manner in which it is to be performed, we declare that what we claim is:

1. In a control system for a circuit breaker which protects an electrical circuit, in combination, means for providing a signal in response to an overcurrent in said circuit, tripping means energizable by said signal to trip said circuit breaker, and static relay means energized by said signal and responsive thereto to control said tripping means, said static relay means comprising capacitor means chargeable in response to said signal and being dischargeable to effect energization of said tripping means when charged to a predetermined level, said static relay means further comprising trigger means responsive to the magnitude of said signal to control charging and discharging of said capacitor means to prevent said capacitor means from effecting energization of said tripping means in the event the magnitude of said signal is below a predetermined level.

2. In a control system for a circuit breaker which protects an electrical circuit, in combination, means for providing a signal in response to an overcurrent in said circuit, tripping means energizable from said signal to trip said circuit breaker, and a static relay energized by said signal and responsive thereto to control energization of said tripping means, said static relay comprising a capacitor dischargeable at a predetermined level to effect energization of said tripping means, trigger means responsive to the magnitude of said signal for controlling said capacitor, said trigger means effecting charging of said capacitor when said signal is above a predetermined value and effecting dissipation of the charge on said capacitor in the event said signal is below a predetermined value, and timing means responsive to said signal for charging said capacitor at a rate of time proportional to the value of said signal.

3. The combination according to claim 2 wherein said timing means for charging said capacitor provides a nonpulsating current which is proportional to the magnitude of said signal.

4. In a control system for a circuit breaker which protects an electrical circuit, in combination, means responsive to an overcurrent in said circuit for providing an output signal related to said overcurrent, tripping means energizable from said signal to trip said circuit breaker, and a static relay energized from said signal for controlling energization of said tripping means, said static relay comprising capacitor means dischargeable at a predetermined level to effect energization of said tripping means, timing means responsive to the magnitude of said signal to effect charging of said capacitor means at a rate of time proportional to the magnitude of said signal, triggering means responsive to the magnitude of said signal to permit charging of said capacitor means to said predetermined level in the event said signal remains above a predetermined magnitude, and instantaneous tripping means for effecting energization of said tripping means independently of said timing means in the event said signal is above a predetermined value.

5. In a control system for a circuit breaker which protects an electrical circuit, in combination, means responsive to an overcurrent in said circuit for providing an output signal related to said overcurrent, tripping means energizable to trip said circuit breaker, capacitor means dischargeable at a predetermined level to effect energization of said tripping means, trigger means comprising at least two transistors having a common emitter connection and responsive to the magnitude of said signal whereby one of said transistors is biased to a conductive state to permit charging of said capacitor means when said signal is above a predetermined magnitude, and timing means responsive to said signal to effect charging of said capacitor means at a rate of time proportional to the magnitude of said signal.

6. In a control system for a circuit breaker which protects an electrical circuit, in combination, means for providing a signal in response to an overcurrent in said circuit, tripping means energizable from said signal to trip said circuit breaker, and a static relay energized by said signal and responsive thereto to control energization of said tripping means, said static relay comprising a capacitor dischargeable at a predetermined level to effect energization of said tripping means, trigger means responsive to the magnitude of said signal for controlling said capacitor, said trigger means effecting charging of said capacitor when said signal is above a predetermined value and effecting dissipation of the charge on said capacitor in the event said signal is below a predetermined value, and timing means responsive to said signal for charging said capacitor at a rate of time proportional to the value of said signal, said timing means providing a pulsating current having a pulsation rate which is proportional to the magnitude of said signal.

7. In a control system for a circuit breaker which protects an electrical circuit, in combination, means responsive to an overcurrent in said circuit for providing an output signal related to said overcurrent, tripping means energizable to trip said circuit breaker, first capacitor means dischargeable at a predetermined level to effect energization of said tripping means, trigger means comprising at least two transistors having a common emitter connection and responsive to the magnitude of said signal whereby one of said transistors is biased to a conductive state to permit charging of said first capacitor means when said signal is above a predetermined magnitude, and timing means responsive to said signal to effect charging of said first capacitor means at a rate of time proportional to the magnitude of said signal, said timing means comprising second capacitor means and a unijunction transistor for generating a pulsating D.C. current for charging said first capacitor means, said D.C. current having a rate of pulsation which varies with the magnitude of said signal.

References Cited by the Examiner

UNITED STATES PATENTS

| Re. 25,762 | 4/1965 | Kotheimer | 317—36 |
|---|---|---|---|
| 2,959,717 | 11/1960 | Conger | 317—33 X |
| 3,018,416 | 1/1962 | Karlicek et al. | 317—33 X |
| 3,144,586 | 8/1964 | Gambale | 317—33 X |
| 3,155,879 | 11/1964 | Casey et al. | 317—33 X |
| 3,178,619 | 4/1965 | Winchel | 317—148.5 |
| 3,187,225 | 6/1965 | Mayer | 317—33 X |

STEPHEN W. CAPELLI, *Primary Examiner.*

SAMUEL BERNSTEIN, *Examiner.*

J. D. TRAMMELL, *Assistant Examiner.*